United States Patent [19]

Hockaday

[11] Patent Number: 5,214,726
[45] Date of Patent: May 25, 1993

[54] STRAIN ISOLATED INTEGRATED OPTIC CHIP PACKAGE

[75] Inventor: Bruce D. Hockaday, Vernon, Conn.

[73] Assignee: United Technologies Corporation, Hartford, Conn.

[21] Appl. No.: 772,759

[22] Filed: Oct. 7, 1991

[51] Int. Cl.$^5$ ............................................. G02B 6/30
[52] U.S. Cl. ...................................................... 385/14
[58] Field of Search ...................................... 385/8-14

[56] References Cited

U.S. PATENT DOCUMENTS

| | | | |
|---|---|---|---|
| 4,871,226 | 10/1989 | Courtnet et al. | 385/14 |
| 5,028,106 | 7/1991 | Hockaday | 385/14 |
| 5,074,630 | 12/1991 | Rodino et al. | 385/14 |

*Primary Examiner*—Akm E. Ullah
*Attorney, Agent, or Firm*—Richard H. Kosakowski

[57] ABSTRACT

A package for an IOC fabricated from an anisotropic material, such as X-cut lithium niobate or lithium tantalate, having identical thermal expansion coefficients in the X and Y directions and a different thermal expansion in the Z direction, or for an IOC fabricated from an isotropic material, such as gallium arsenide or silicon, includes an IOC enclosure having a planar mounting surface which has identical thermal expansion coefficients in the X and Y directions. The coefficients of the planar mounting surface are relatively similar to the thermal expansion coefficients of a planar surface of the IOC. A planar surface of the IOC is attached to the planar mounting surface of the package.

23 Claims, 3 Drawing Sheets

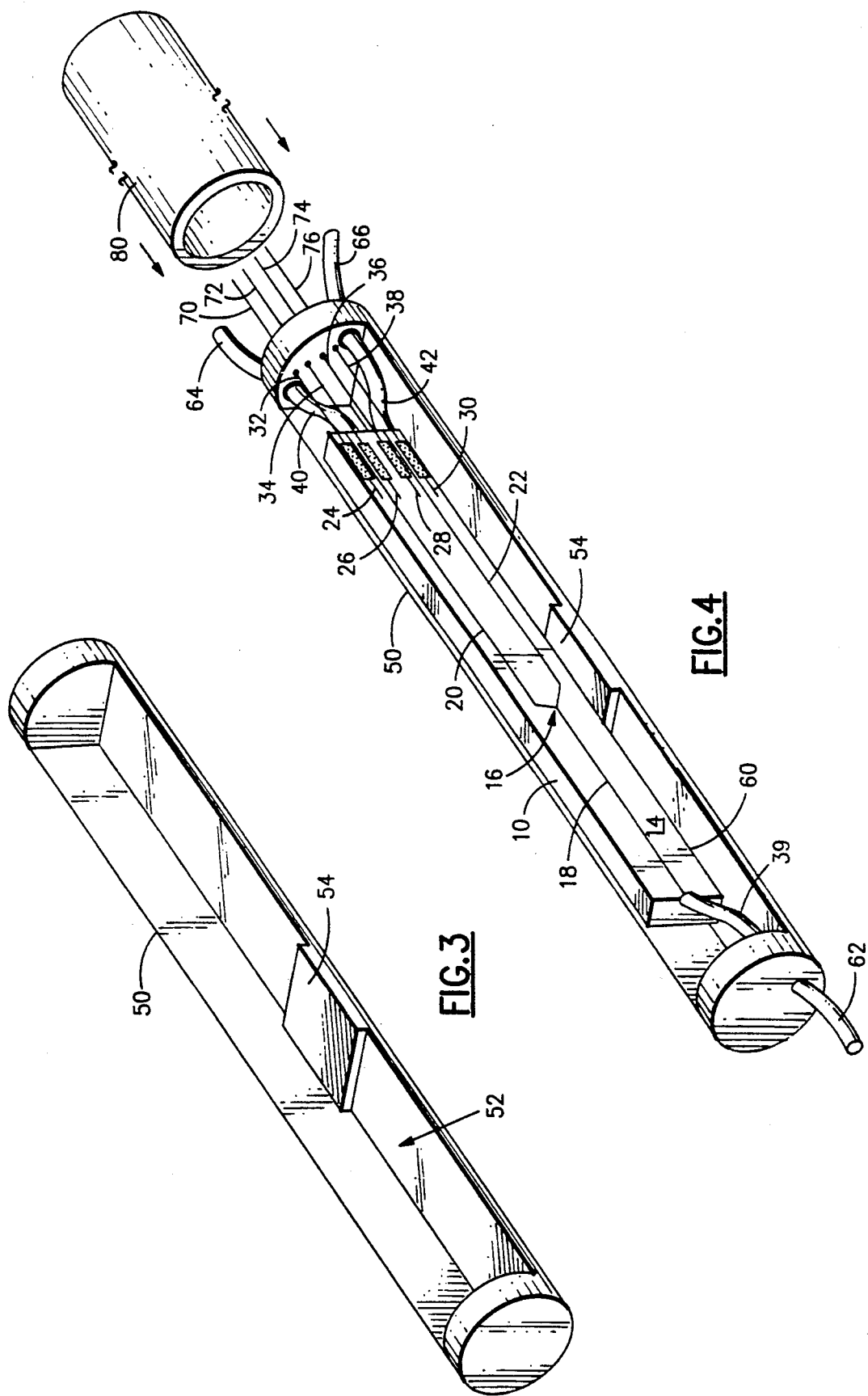

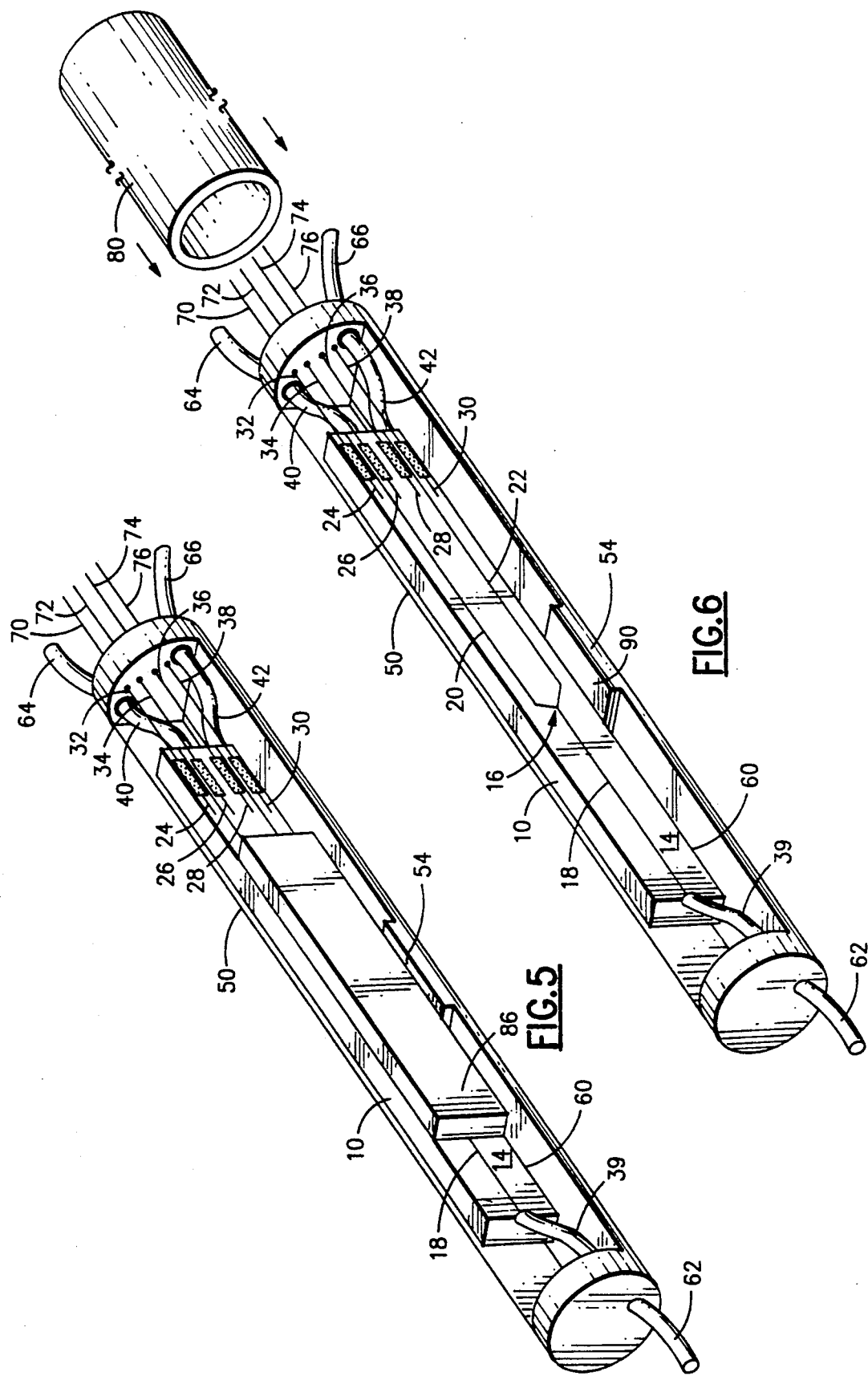

1

STRAIN ISOLATED INTEGRATED OPTIC CHIP PACKAGE

TECHNICAL FIELD

This invention relates to integrated optics, and more particularly to the packaging of integrated optic chips.

BACKGROUND ART

Integrated optic chips (IOCs) fabricated from X-cut lithium niobate have two different thermal expansion coefficients in the bottom plane of the IOC. Thus, lithium niobate is an anisotropic material. The expansion coefficients are $15.4 \times 10^{-6}/°C.$ in the X and Y directions, and $7.5 \times 10^{-6}/°C.$ in the Z direction. The anisotropic thermal expansion of lithium niobate creates a difficult packaging problem, so far as producing a relatively good thermal expansion match between a bottom plane of the IOC and the package. A poor thermal expansion match between the IOC and package will produce excessive stress gradients in the bonding material, initiating bond line failures as well as inducing stress in the lithium niobate. The stress may change the optical properties of the lithium niobate, causing errors in optical signals propagating in a waveguide in the IOC. The stress may also cause cracking of the IOC at extreme temperatures. Thus, attaching the bottom plane of the X-cut lithium niobate to the package is unwise.

DISCLOSURE OF INVENTION

Objects of the present invention include provision of a relatively small package for an IOC which isolates the IOC from possible strain induced therein by thermal expansion and mechanical bending of the package.

Further objects include the provision of a package for an IOC which provides for a reliable optical connection between the IOC and the package.

According to the present invention, a package for an IOC fabricated from an anisotropic material, such as X-cut lithium niobate or lithium tantalate having identical thermal expansion coefficients in the X and Y directions and a different thermal expansion in the Z direction, or for an IOC fabricated from an isotropic material, such as gallium arsenide or silicon, comprises an IOC enclosure having a planar mounting surface which has identical thermal expansion coefficients in the X and Y directions, the coefficients of the planar mounting surface being relatively similar to the thermal expansion coefficients of a planar surface of the IOC, a planar surface of the IOC being attached to the planar mounting surface of the package.

In further accord with the present invention, the IOC has a waveguide formed on, or imbedded in, a major surface; an optical fiber connects to the waveguide and to the package for external package connection, the fiber is conformed to a relatively curved shape to allow for movement of the fiber due to thermal expansion and/or mechanical bending of the package without disturbing the integrity of the fiber connections to the IOC and package.

The present invention has utility in providing for the packaging of an IOC fabricated from lithium niobate or other common IOC material such that the IOC is isolated from possible strain induced into the IOC due to thermal expansion and mechanical bending of the package, while at the same time keeping the overall package size relatively small. The package, which may be implemented as a low cost hermetic design, provides for a functional test of the IOC therewithin before final assembly in a host system package.

Further, conforming the optical fiber connection between the IOC and the package to a curved path allows for relative movement between the IOC and package, such movement being due to thermal expansion and/or mechanical bending of the package. In this way the optical fiber will move as a result of such expansion and/or bending and assume a new radius of curvature without mechanical pulling on the attachment points of the fiber to the IOC and package.

These and other objects, features and advantages of the present invention will become more apparent in light of the detailed description of a best mode embodiment thereof, as illustrated in the accompanying drawings.

BRIEF DESCRIPTION OF DRAWINGS

FIG. 3 is a perspective view of a tubular shaped housing according to the present invention;

FIG. 4 is a perspective view of the housing of FIG. 3 with the IOC of FIG. 2 mounted therein according to the present invention;

FIG. 5 is a perspective view of the housing of FIG. 3 with the IOC of FIG. 2 mounted therein in accordance with an alternative embodiment of the present invention; and FIG. 6 is a perspective view of the housing of FIG. 3 with the IOC of FIG. 2 mounted therein in accordance with a further alternative embodiment of the present invention.

BEST MODE FOR CARRYING OUT THE INVENTION

Figure 1:
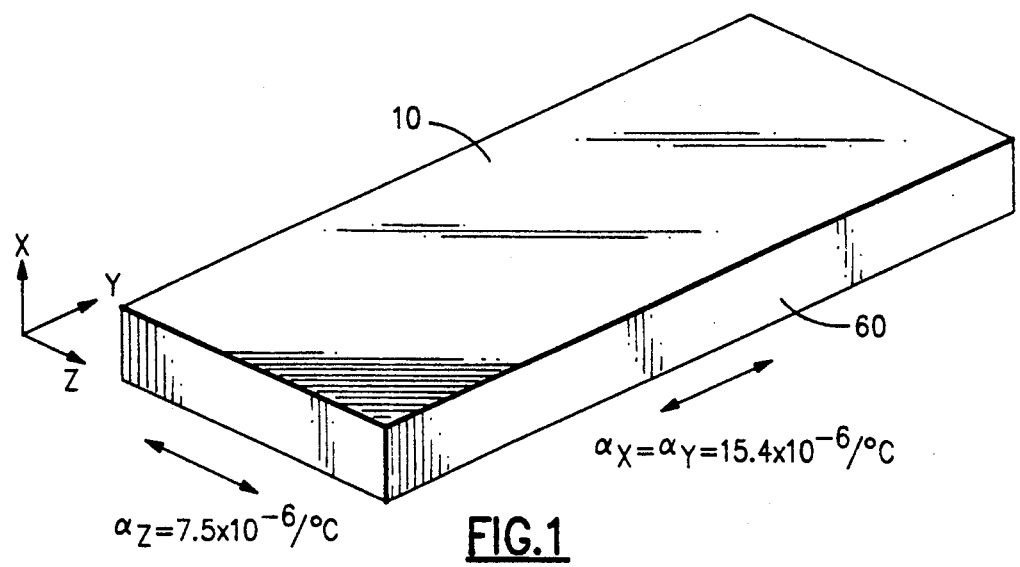
FIG. 1 is a perspective view of an IOC.

FIG. 1 is a perspective view of a rectangular-shaped IOC 10 fabricated from X-cut, Y-propagation lithium niobate, $LiNbO_3$. Lithium niobate is an orientation-dependent (anisotropic) material that has different thermal expansion coefficients in two different directions, e.g., for the X-cut IOC of FIG. 1, along the X,Y axes, and Z axis, respectively. The coefficients, $\alpha_x$ and $\alpha_y$, in the X and Y directions, respectively, are both $15.4 \times 10^{-6}/°C.$, while the coefficient, $\alpha_z$, in the Z direction is $7.5 \times 10^{-6}/°C.$ Referring to FIG. 2, the IOC 10 of FIG. 1 typically has a waveguide 12 formed on a major surface thereof 14. The waveguide 12 may comprise a simple Y-junction 16, as described in U.S. Pat. No. 4,984,861, to Suchoski Jr. et al., and assigned to the assignee of the present invention, and which is hereby incorporated by reference. Or, the waveguide may be of a more complex form, such as a Mach-Zender interferometer. The IOC may have additional devices such as phase modulators or filters formed on the waveguide surface. The type of waveguide is irrelevant to the present invention; the waveguide depends on the function of the host system that the IOC resides in. For example, the host system may comprise a fiber optic gyro, a photonic switching device, an antenna system, or an intensity/phase modulation system. Further, the waveguide may be formed on the IOC surface by known techniques, such as proton exchange or titanium indiffusion, or by an annealed proton exchange ("APE ™") method disclosed and claimed in the aforementioned Suchoski Jr. et al. patent.

Figure 2:
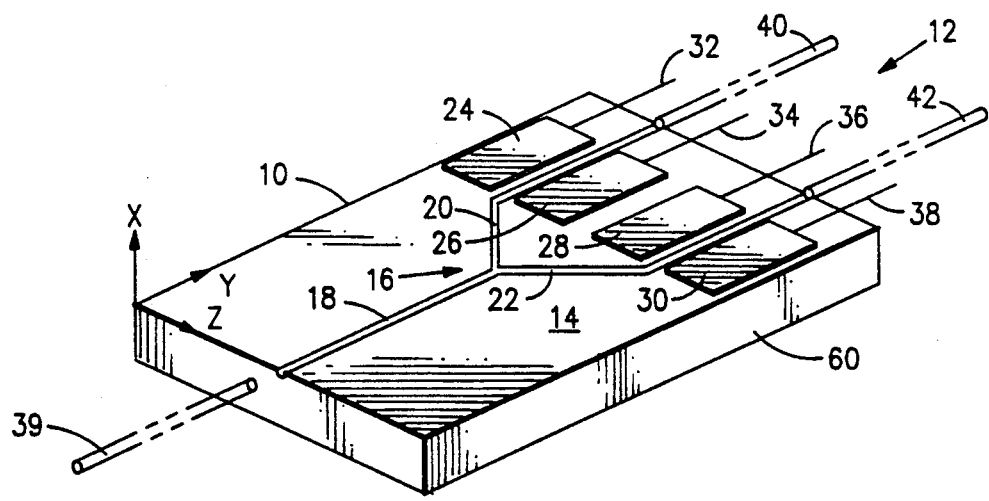
FIG. 2 is a perspective view of the IOC of FIG. 1 having a waveguide and modulators formed on a major surface thereof.

The Y-shaped waveguide 12 of FIG. 2 comprises an input guide section 18, and a pair of output guide sections 20,22. The IOC further includes an electrode array comprising the paired electrodes 24,26 and 28,30; each defining integrated optic phase modulators. The electrodes 24–30 are deposited on the waveguide surface 14 using well known photolithographic techniques. In operation, voltage signals fed to the electrodes on corresponding signal lines 32–38 control the phase of the light energy wave passing through the associated guide section 20,22. This phase control is accomplished through the well known electrooptic effect.

The IOC 10 connects to other host system elements through input and output optical fibers, 39 and 40,42 respectively, which are shown in phantom. The fibers 39–42 connect to the IOC's input and output guide sections 18–22 using well known pigtailing techniques. A representative pigtailing technique is described in U.S. Pat. No. 4,871,236 to Courtney et al., assigned to the assignee of the present invention, and which is hereby incorporated by reference. However, it is to be understood that any known method of attaching optical fibers to IOC may be utilized in conjunction with the broadest scope of the present invention.

In FIG. 3 is illustrated a perspective view of a tubular-shaped housing 50 in accordance with the present invention. The housing 50 is fabricated from stainless steel or other material, e.g., metals or ceramics, or may be formed by a molding process involving powdered metals. The fact that most metals and ceramics have isotropic thermal expansion coefficients is irrelevant to the present invention. The housing material is chosen to have thermal expansion coefficients which are relatively similar to those of the IOC material.

A portion of the tubular housing material is cut away during fabrication to form an opening 52; thus, the housing outer surface is not a continuous cylinder. The opening 52 allows access inside the housing for IOC mounting, as described in detail hereinafter with respect to FIGS. 4, 5. The housing has a mounting pedestal 54 fabricated therein in a central location in the form of a square- or rectangular-shaped planar mounting surface. The pedestal surface 54 has identical thermal expansion coefficients in both directions.

Referring to FIGS. 1, 2, and 4, a planar surface 60 of the lithium niobate IOC 10 in the X and Y directions mounts to the pedestal surface 54. This allows the identical thermal expansion coefficients of the IOC in the X and Y directions to be matched to the relatively similar thermal expansion coefficients of the isotropic housing material. The IOC surface 60 is secured to the pedestal surface 54 with a compliant material, such as, e.g., an elastomer adhesive comprising the commercially available RTV adhesive. The compliant material absorbs any thermally- and/or mechanically-induced strain generated by the housing before it reaches the IOC, the thermal strain being due in part to a small amount of mismatch between the thermal expansion coefficients of the IOC and of the housing material.

The IOC is mounted such that the only contact it makes with the inside of the housing is at the pedestal surface. Maintaining such a clearance between the IOC and housing allows the housing to deflect, due to external forces, without touching the IOC.

Each optical fiber 39–42 may be connected to the waveguide 12 in accordance with, e.g., the aforementioned U.S. Pat. No. 4,871,236 to Courtney et al. Each fiber is also connected to a corresponding end of the the housing 50 by known glass bonding techniques, which may include epoxies. The connection to the housing is for connection external thereto, i.e., to the host system using corresponding external fibers 62–66.

According to another aspect of the present invention, each fiber 39–42 is conformed to a relatively curved shape. This allows for movement of the fiber due to thermal expansion and/or mechanical bending of the housing 50 without disturbing the integrity of the fiber connections to the IOC and housing. The fiber will assume a new radius of curvature without mechanical pulling on the attachment points of the fiber to the IOC and housing.

Also illustrated in FIG. 4 are the wire electrical connections between the waveguide electrodes 24–30 and the housing 50. The connections are typically made by soldering the wires 32–38 to the housing. Appropriate insulators may be used to isolate the solder connections from each other. Attached to the outside of the housing are corresponding connecter pins 70–76. The design of the tubular housing provides for a functional test of the IOC therewithin before final assembly in a host system package.

A cylindrical outer tube 80 may be slipped over the tubular housing 50 and connected thereto. The outer tube 80 may be fabricated from a material similar to that of the housing. The outer tube, together with the design of the tubular housing, provide for a hermetic seal, protecting the IOC inside the housing from the environment.

Once the IOC is mounted within the housing and all of the foregoing optical and electrical connections have been made, the empty space around the IOC within the tubular housing may be filled with a viscous damping fluid (not shown), such as a gel or grease. The damping fluid suppresses any resonant vibration from affecting IOC operation.

In FIG. 5 is illustrated an alternative embodiment of the IOC of FIG. 2 mounted within the housing of FIG. 3. FIG. 5 is identical to FIG. 4, with the exception that an optional slab of material 86, similar to that of the IOC 10, is mounted to both the IOC waveguide surface 14 and the pedestal mounting surface 54. The slab 86 effectively increases the surface area of the IOC to be bonded to the housing. For an X-cut lithium niobate IOC, the slab also comprises X-cut lithium niobate. The slab is mounted such that its X and Y thermal expansions coefficients are oriented with the coefficients of the pedestal in a similar manner as that of the IOC. Further, the slab is bonded to both the waveguide surface of the IOC and to the pedestal surface by a similar compliant material.

As illustrated, the IOC material is X-cut lithium niobate. However, other common IOC materials may be used, such as lithium tantalate, without departing from the broadest scope of the present invention. Such materials are anisotropic. However, it is to be understood that isotropic IOC materials, such as gallium arsenide or silicon, may be mounted within a package, in accordance with the present invention. In such a case, the isotropic IOC does not necessarily have to be mounted on its side; the IOC may, instead, be mounted on to the package by means of its bottom plane.

Further, the IOC has been described as being mounted directly to the housing pedestal mounting surface. However, if desired, a thermal matching transformer 90, as illustrated in FIG. 6, comprised of an anisotropic material such as pyrolytic graphite, calcite, barium titanate or crystal quartz, may be used to match either the anisotropic or isotropic thermal expansion coefficients of the IOC to the isotropic pedestal mounting surface. FIG. 6 is identical in all respects to FIG. 4, except for the addition of the transformer 90. The thermal matching transformer may be that described and claimed in U.S. Pat. No. 5,028,106 to Hockaday, assigned to the assignee of the present invention, and which is hereby incorporated by reference.

All of the foregoing changes are irrelevant to the broadest scope of the present invention; it suffices that a package for an IOC fabricated from an anisotropic material, such as X-cut lithium niobate or lithium tantalate, having identical thermal expansion coefficients in the X and Y directions and a different thermal expansion in the Z direction, or for an IOC fabricated from an isotropic material, such as gallium arsenide or silicon, comprises an IOC enclosure having a planar mounting surface which has thermal expansion coefficients that are identical in the X and Y directions, the thermal expansion coefficients of the planar mounting surface being relatively similar to the thermal expansion coefficients of a planar surface of the IOC, a planar surface of the IOC being attached to the planar mounting surface of the package.

Although the invention has been illustrated and described with respect to a best mode embodiment thereof, it should be understood by those skilled in the art that the foregoing and various other changes, omissions, and additions in the form and detail thereof may be made without departing from the spirit and scope of the invention.

I claim:

1. Apparatus, comprising:
   a integrated optic chip, having a waveguide formed on, or imbedded in, a major surface, and having one or more planar side surfaces;
   a housing, fabricated from a material having isotropic thermal expansion coefficients, having a planar pedestal mounting surface fabricated therein, said integrated optic chip being mounted within said housing such that one of said one or more planar side surfaces is mounted to said planar pedestal mounting surface.

2. The apparatus of claim 1, wherein said one of said one or more planar side surfaces is mounted to said planar pedestal mounting surface with a compliant material.

3. The apparatus of claim 1, wherein said housing comprises a tubular-shaped housing, having an opening formed therein for access to said integrated optic chip.

4. The apparatus of claim 3, further comprising an outer cylindrical-shaped tube, disposed to cover said housing so as to form a hermetic seal for said integrated optic chip disposed within said housing.

5. The apparatus of claim 3, further comprising a viscous material disposed to fill a portion of all of any air space within said housing.

6. The apparatus of claim 1, further comprising one or more optical fibers, each of said fibers being disposed within said housing and being connected to a predetermined location on said integrated optical chip at said waveguide and being connected to said housing.

7. The apparatus of claim 6, wherein each of said one or more optical fibers is conformed to a relatively curved path so as to allow for movement of said fiber due to thermal expansion and mechanical bending of said housing without disturbing the integrity of said fiber connections to said integrated optic chip and to said housing.

8. The apparatus of claim 1, further comprising a thermal coefficient transformer disposed between said planar side surface and said pedestal planar mounting surface.

9. The apparatus of claim 8, wherein said thermal coefficient transformer comprises anisotropic material.

10. The apparatus of claim 9, wherein said anisotropic material comprises pyrolytic graphite.

11. The apparatus of claim 9, wherein said anisotropic material comprises calcite.

12. The apparatus of claim 9, wherein said anisotropic material comprises barium titanate.

13. The apparatus of claim 9, wherein said anisotropic material comprises crystal quartz.

14. The apparatus of claim 1, wherein said integrated optic chip comprises anisotropic material, each of said one or more planar side surfaces having identical thermal expansion coefficients in each direction.

15. The apparatus of claim 1, wherein said integrated optic chip comprises isotropic material, each of said one or more planar side surfaces having identical thermal expansion coefficients in each direction.

16. The apparatus of claim 1, wherein said integrated optic chip comprises lithium niobate, each of said one or more planar side surfaces having identical thermal expansion coefficients in each direction.

17. The apparatus of claim 1, wherein said integrated optic chip comprises X-cut lithium niobate, each of said one or more planar side surfaces having identical thermal expansion coefficients in each direction.

18. The apparatus of claim 1, wherein said integrated optic chip comprises lithium tantalate, each of said one or more planar side surfaces having identical thermal expansion coefficients in each direction.

19. The apparatus of claim 1, wherein said integrated optic chip comprises X-cut lithium tantalate, each of said one or more planar side surfaces having identical thermal expansion coefficients in each direction.

20. The apparatus of claim 1, wherein said integrated optic chip comprises gallium arsenide, each of said one or more planar side surfaces having identical thermal expansion coefficients in each direction.

21. The apparatus of claim 1, wherein said integrated optic chip comprises X-cut gallium arsenide, each of said one or more planar side surfaces having identical thermal expansion coefficients in each direction.

22. The apparatus of claim 1, wherein said integrated optic chip comprises silicon, each of said one or more planar side surfaces having identical thermal expansion coefficients in each direction.

23. The apparatus of claim 1, wherein said integrated optic chip comprises X-cut silicon, each of said one or more planar side surfaces having identical thermal expansion coefficients in each direction.

* * * * *